(12) United States Patent
Tandberg et al.

(10) Patent No.: US 11,168,824 B2
(45) Date of Patent: Nov. 9, 2021

(54) POPPET COUPLING

(71) Applicant: FMC Kongsberg Subsea AS, Kongsberg (NO)

(72) Inventors: Geir Tandberg, Tranby (NO); Peter Bergsland, Nærsnes (NO)

(73) Assignee: FMG Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 16/310,431

(22) PCT Filed: Jun. 15, 2017

(86) PCT No.: PCT/EP2017/064681
§ 371 (c)(1),
(2) Date: Dec. 15, 2018

(87) PCT Pub. No.: WO2017/216296
PCT Pub. Date: Dec. 21, 2017

(65) Prior Publication Data
US 2019/0186666 A1 Jun. 20, 2019

(30) Foreign Application Priority Data
Jun. 16, 2016 (NO) .................................. 20161018

(51) Int. Cl.
*F16L 37/32* (2006.01)
*F16L 29/04* (2006.01)
(Continued)

(52) U.S. Cl.
CPC ............... *F16L 37/32* (2013.01); *F16L 29/04* (2013.01); *B33Y 80/00* (2014.12); *E21B 33/038* (2013.01);
(Continued)

(58) Field of Classification Search
CPC . F16L 37/32; F16L 37/36; F16L 37/30; F16L 37/34; F16L 29/04
(Continued)

(56) References Cited

U.S. PATENT DOCUMENTS 3,215,161 A 11/1965 Goodwin et al.
3,918,485 A 11/1975 Weber et al.
(Continued)

FOREIGN PATENT DOCUMENTS

CN 203189931 U 9/2013
DE 1425430 A1 * 2/1969 ............... F16L 37/32
(Continued)

*Primary Examiner* — Kevin L Lee (57) ABSTRACT

The present invention provides a double poppet valve coupling comprising a first coupling half (1) and a second coupling half (2), wherein each of the first and second coupling halves comprises a housing (3) and a poppet valve assembly (7) with a spring biased poppet element (9), wherein the housing comprises a through-going bore (4), a first connecting end (5), a second connecting end (6) and a poppet seat (11), and the first and the second coupling halves may be coupled together via their respective first connecting ends (5) such that the respective poppet valve assemblies are opened providing a continuous flow path through the coupling; the end section of the poppet element comprises a pressure equalizing fluid channel (36*a*,36*b*).

11 Claims, 10 Drawing Sheets

(51) Int. Cl.
*F16L 37/56* (2006.01)
*F16L 39/00* (2006.01)
*B33Y 80/00* (2015.01)
*E21B 33/038* (2006.01)
*F16L 1/26* (2006.01)

(52) U.S. Cl.
CPC .................. *F16L 1/26* (2013.01); *F16L 37/56* (2013.01); *F16L 39/00* (2013.01)

(58) Field of Classification Search
USPC ........ 137/614.03–614.05; 251/360, 363, 361
See application file for complete search history.

(56) References Cited

U.S. PATENT DOCUMENTS

| | | | |
|---|---|---|---|
| 5,339,861 A | 8/1994 | Smith, III | |
| 5,791,376 A | 8/1998 | Richmond | |
| 5,947,142 A | 9/1999 | Nimberger et al. | |
| 6,206,040 B1 | 3/2001 | Smith, III | |
| 6,626,207 B1 | 9/2003 | Smith, III | |
| 7,168,678 B2 * | 1/2007 | Schaupp et al. | F16K 1/385 251/122 |
| 8,985,131 B2 * | 3/2015 | Cheon et al. | F16L 37/367 137/1 |
| 2013/0092248 A1 | 4/2013 | June | |
| 2016/0025210 A1 | 1/2016 | Kujawski, Jr. et al. | |

FOREIGN PATENT DOCUMENTS

| | | |
|---|---|---|
| DE | 42 02 491 C1 | 5/1993 |
| EP | 2 757 300 A1 | 7/2014 |
| GB | 1081250 | 8/1967 |
| GB | 2 076 917 A | 12/1981 |
| GB | 2 278 657 A | 12/1994 |
| GB | 2 404 426 A | 2/2005 |
| WO | WO 2006/077482 A1 | 7/2006 |

* cited by examiner

Fig. 11 (Detail I)

POPPET COUPLING

FIELD OF THE INVENTION

The present invention relates to the field of poppet valve couplings, and more particular to the field of double poppet valve couplings.

BACKGROUND

Double poppet valve couplings are well known in the prior art. Common disadvantages of prior art couplings are high pressure drops and complicated service procedures requiring replacement and/or retrieval of the whole coupling.

Various prior art couplings are disclosed in U.S. 2001/0025659 A1, U.S. Pat. No. 6,626,207 B1, U.S. Pat. Nos. 3,918,485 B, 5,339,861 B, 6,206,040 B1 and U.S. 2013/0092248 A1.

The goal of the present invention is to provide a double poppet valve coupling which avoids at least some of the disadvantages of the prior art couplings.

SUMMARY OF THE INVENTION

The present invention is defined by the appended claims and in the following:

In a first aspect, the present invention provides a double poppet valve coupling comprising a first coupling half and a second coupling half, wherein each of the first and second coupling halves comprises a housing and a poppet valve assembly, wherein
- the housing comprises a through-going bore, a first connecting end, a second connecting end and a poppet seat, and the first and the second coupling halves may be coupled together via their respective first connecting ends such that the respective poppet valve assemblies are opened providing a continuous flow path through the coupling;
- the poppet valve assembly is centrally arranged in the through-going bore and comprises an anchoring element, a poppet element and a spring;
  - the anchoring element is connected to an inner surface of the through-going bore and comprises a cylindrical section and an end section, the end section has an outer circumference tapering off towards the second connecting end (the outer circumference may preferably taper off to a sharp point);
  - the poppet element is slidably connected to the anchoring element and comprises a cylindrical section and an end section, the end section comprises a poppet seal surface for interaction with the poppet seat, and an actuator rod extending in the direction of the first connecting end; and
  - the spring is arranged between the poppet element and the anchoring element and preloads the poppet element to abut against the poppet seat, closing the through-going bore, in a first position, and is enclosed within a hollow cylindrical section of the poppet element and/or the anchoring element providing an open, and preferably smooth, through-going bore when the poppet element is in a second position;
- the anchoring element and the poppet element are arranged to provide an annular flow path between the outer surface of the poppet valve assembly and the inner surface of the through-going bore.

The poppet seat faces the poppet seal surface of the poppet element. The poppet seal surface is preferably conical, but may also be convex. The poppet seal surface faces in the direction of the first connecting end.

The housing may preferably comprise a connecting seal seat at the first connecting end for sealing between the two coupling halves when the two coupling halves are coupled together via their respective first connecting ends.

In an embodiment of the coupling according to the invention, the first and the second coupling halves are coupled together by an intermediate connecting element forming a seal between the first connecting ends of the coupling halves.

In an embodiment of the coupling according to the invention, the first connecting end comprises a valve seat ring comprising the poppet seat, the valve seat ring is releasably connected, such that the poppet element may be replaced via the first connecting end if required. Preferably, the valve seat ring is releasably connected by cooperating threads on the valve seat ring and the housing.

In an embodiment of the coupling according to the invention, an outer circumferential surface of the anchoring element and an outer circumferential surface of the poppet element have the same diameter and are adjacently joined to form an even surface when the poppet element is in the second position.

In an embodiment of the coupling according to the invention, the anchoring element is connected to the inner surface of the through-going bore by at least three plate elements. The plane of each of the plate elements is arranged in parallel to the centerline of the coupling.

In an embodiment of the coupling according to the invention, at least a section of the housing, the anchoring element and the plate elements are made as a single unit by use of additive manufacturing. Preferably, each of the plate elements comprises an inclined edge having an angle $\alpha$ of less than 55°, preferably less than 50°, with respect to the centerline of the coupling.

In an embodiment of the coupling according to the invention, the inclined edge of each of the plate elements faces the second connecting end and is inclined from the inner surface towards the second end of the anchoring element. The inclination or angle of the inclined edge is preferably such that the edges are closer to the second connecting end at the inner surface of the through-going bore than at the point of the second end.

In an embodiment of the coupling according to the invention, the anchoring element and the poppet element form a unitary outer surface when the poppet element is in the second position, the unitary outer surface comprises a cylindrical middle section, a first end section comprising the poppet seal surface and a second end section having an outer circumferential surface tapering off towards the second connecting end.

In an embodiment of the coupling according to the invention, the cylindrical middle section has a first end adjacent to the first end section and a second end adjacent to the second end section, the circumference at the first end being equal to the largest circumference of the first end section and the circumference at the second end being equal to the largest circumference of the second end section.

In an embodiment of the coupling according to the invention, the outer circumference of the cylindrical middle section is substantially constant between the first end section and the second end section.

In an embodiment of the coupling according to the invention, the intermediate connecting element comprises a cylindrical connecting seal and the valve seat ring comprises a connecting seal seat for the cylindrical connecting seal, the cylindrical connecting seal is arranged to seal against both the connecting seal seat of the first coupling half and the connecting seal seat of the second coupling half when the coupling halves are connected. Preferably, the cylindrical connecting seal comprises a first and a second end, each end having an external conical seal surface for sealing against a connecting seal seat.

In an embodiment of the coupling according to the invention, a center element is arranged within the cylindrical connecting seal, the center element arranged to operationally connect the actuator rod of the first coupling half and second coupling half, such that the poppet elements are moved to the second position when the coupling halves are connected.

In an embodiment of the coupling according to the invention, the center element comprises a first actuator end and a second actuator end for interaction with the actuator rod of the first and the second actuator rod, respectively.

In an embodiment of the coupling according to the invention, at least a section of the housing, i.e. the section accommodating the anchoring element, the anchoring element and the plate elements are produced as a single unit by use of additive manufacturing.

In an embodiment of the coupling according to the invention, the end section of the poppet element comprises a pressure equalizing fluid channel providing fluid contact between an enclosure, formed by the hollow cylindrical section of the poppet element and the anchoring element, and the annular flow path when the poppet assembly is open, i.e. when the poppet element is in the second position, and between the enclosure and the surroundings of the coupling when the poppet assembly is closed, i.e. when the poppet element is in the first position. In a preferred embodiment, a fluid tight sealing is provided between the hollow cylindrical section of the poppet element and the anchoring element, such that a fluid present in the annular flow path is prevented from entering the enclosure when the poppet element is in the first position.

In an embodiment of the coupling according to the invention, the anchoring element and the poppet element are slidably connected by the cylindrical section of the anchoring element and the cylindrical section of the poppet element.

In an embodiment of the coupling according to the invention, the first and the second coupling halves are mirror images of each other when connected.

In an embodiment of the coupling according to the invention, the cylindrical section of the poppet element and the cylindrical section of the anchoring element are hollow, wherein one end of the hollow cylindrical sections is open and the other end is closed off by the corresponding end section.

In an embodiment of the coupling according to the invention, the poppet seal surface comprises at least one annular or circular rib, preferably three adjacent ribs.

In an embodiment of the coupling according to the invention, the valve seat ring of the first coupling half comprises a male/stab connecting interface and the valve seat ring of the second coupling half comprises a cooperating female/receptacle connecting interface.

In an embodiment of the coupling according to the invention, at least one of the actuator rod of the first coupling half and the second coupling half comprises at least three centering elements. The centering elements are arranged to restrict movement of the actuator rod in a direction perpendicular to the centerline of the coupling. In a preferred embodiment, the centering elements are plate-shaped. The plane of each plate-shaped centering element is aligned with the centerline of the coupling.

In a second aspect, the present invention provides a hub for connecting multiple fluid couplings according to any embodiment of the first aspect, comprising a retaining plate having multiple through bores, wherein each through bore accommodates a coupling half.

SHORT DESCRIPTION OF THE DRAWINGS

The present invention is described in more detail by reference to the following drawings.

DETAILED DESCRIPTION OF THE INVENTION

Figure 1:
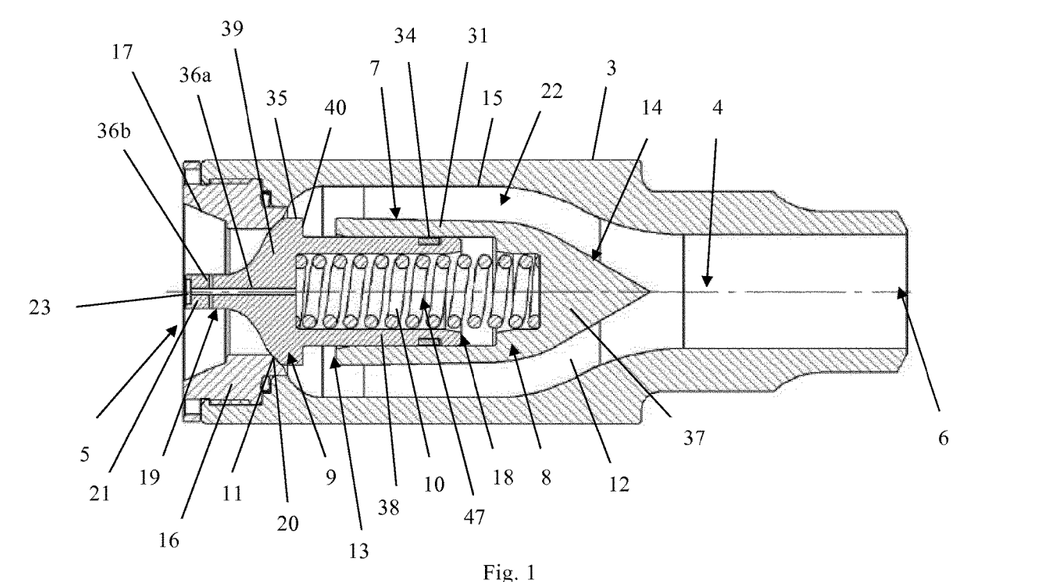
FIG. 1 is a cross-sectional view of a first embodiment of a coupling half according to the invention.
Figure 2:
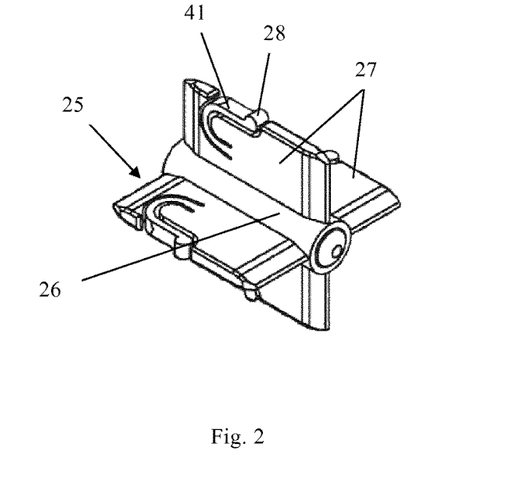
FIG. 2 is a perspective view of a center element for providing operational contact between two coupling halves.
Figure 3:
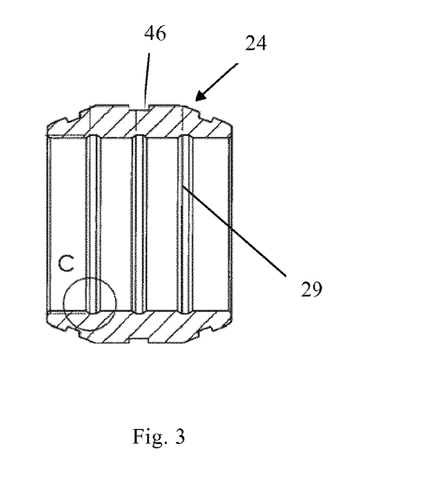
FIG. 3 is a cross-sectional view of a cylindrical connecting seal for providing sealing between two coupling halves.

The present invention provides a double poppet valve coupling made up of two coupling halves, wherein each coupling half features a respective poppet valve. The coupling halves are preferably equal, and are connected via a connecting unit comprising a cylindrical connecting seal, see FIG. 3, and a center element, see FIG. 2. A cross-sectional view of a first embodiment of a coupling half is illustrated in FIG. 1. The coupling half features a housing 3 having a through-going bore 4, a first connecting end 5, a second connecting end 6, a poppet seat 11 and a poppet valve assembly 7. The two halves of a coupling are connected via their respective first connecting ends 5. The second connecting end may for instance be welded to a suitable fluid line.

The poppet valve assembly 7 is arranged in the through-going bore, and comprises an anchoring element 8, a poppet element 9 and a spring 10. The poppet element is movable between a first position, wherein the poppet element abuts or interacts with the poppet seat, i.e. the through-going bore is closed, and a second position, wherein the poppet element is retracted from the poppet seat and the through-going bore is open.

The anchoring element 8 comprises a first hollow cylindrical element (i.e. comprises a cylindrical section 31 which is hollow and an end section 37) connected to an inner surface 15 of the through-going bore 4 and having a first end 13 and a second end 14. The first end 13 faces the first connecting end 5 of the housing and the second end 14 comprises a tapered section (i.e. the second end constitutes a part of the end section 37). The tapered section has an outer circumference tapering off to a point in the direction of the second connecting end. The tapering off to a point allows for a minimal pressure drop and a smooth transition as the flow path changes from having a full circular cross-section, i.e. the through-going bore between the second connecting end and the point of the anchoring element, to having an annular cross-section, i.e. the annular flow path 22 provided between the outer circumference of the anchoring element and the inner surface of the through-going bore. The flow path is considered annular over the whole poppet valve assembly despite the presence of the plate elements 12 described below. The area of the full circular cross-section is similar or equal to the area of the annular cross-section.

The anchoring element 8 is connected to the inner wall 15 via four plate elements 12. In other embodiments, the number of plate elements is commonly at least three, but may also be less as long as the anchoring element is sufficiently immobilized at the center of the through-going bore. In a highly advantageous embodiment, the housing 3, the anchoring element 8 and the plate elements 12 are manufactured as a single element/part by use of 3D printing technology, also called additive manufacturing. Details around some features related to additive manufacturing is discussed in relation to FIG. 6. The use of 3D printing allows for the production of a housing 3 having a reduced outer diameter compared to the diameter obtainable by common manufacturing techniques wherein the housing 3, the anchoring element 8 and the plate elements 12 are made as separate parts prior to assembly. Thus, by use of 3D printing it is possible to obtain a smaller/narrower coupling without reducing the fluid/flow capacity.

The poppet element 9 comprises a second hollow cylindrical element (i.e. comprises a cylindrical section 38 which is hollow and an end section 39) having a first end 18 and a second end 19. The first end faces the second connecting end 6 and the second end faces the first connecting end 5. The second end comprises a conical valve seal surface 20 (i.e. a poppet seal surface) facing the valve seat 11 and an actuator rod 21 having an actuating end 23 extending in the direction of the first connecting end 5 (i.e. the second end 19 constitutes a part of the end section 39). A shoulder 35 provides a pressure surface 40 formed between the cylindrical section 38 and the end section 39. The pressure surface allows for a tighter sealing when the internal fluid pressure is high by providing a sealing force in addition to the spring 10. The shoulder 35 has an outer diameter/circumference being equal to the outer diameter/circumference of the first end 13 of the first hollow cylindrical element. The spring 10 is arranged to preload the poppet element 9 into the first position, wherein the through-going bore is closed. Movement of the actuating rod 21 in the direction of the second connecting end will push the poppet element away from the poppet seat 11 and into the second position, wherein the through-going bore is open.

In the present embodiment, both the poppet element 9 and the anchoring element 8 comprise a hollow cylindrical section. The hollow cylindrical sections are slidably connected and form an enclosure 47 within which the spring is arranged. A seal 34 is provided between the hollow cylindrical sections to ensure that the enclosure is not in fluid contact with the fluid flow path 4,22 of the coupling half when the coupling is closed. The enclosure is pressure compensated by a fluid channel 36 extending through the actuator rod. The fluid channel comprises a first fluid channel 36a along the centerline of the actuator rod 21, and a second fluid channel 36b being transverse, and connected to, the first fluid channel. The first fluid channel 36a is arranged to pressure compensate the enclosure against the surroundings of the housing 3 when the through-going bore is closed, and the second fluid channel 36b is able to evacuate fluid from the enclosure when the coupling is opening or made up (i.e. when the poppet element moves to the second position) and let fluid enter the enclosure when the coupling is closing (i.e. when the poppet element moves into the first position).

The poppet seat 11 faces the conical valve seal surface 20 of the poppet element and is arranged on one side of a valve seat ring 16. The valve seat ring is releasably connected to the first connecting end 5 of the housing 4 (or comprise a part of the first connecting end 5); in this embodiment by a threaded connection. By having the valve seat ring releasably connected at the first connecting end, the valve seat ring may easily be removed and the poppet element 9 may be replaced, for instance without having to disconnect the coupling half from a pipe line to which the second connecting end may be welded. This feature is especially advantageous when the coupling is arranged subsea as it allows for a highly simplified service procedure, for instance for flushing of the fluid line connected to the coupling half. The valve seat ring has a connecting seal seat 17 arranged on the opposite side of the poppet seat 11. The connecting seal seat is for the cylindrical connecting seal 24, see FIG. 3. The cylindrical connecting seal has a conical outer seal surface on each end for interaction with the connecting seal seats 17 of the two coupling halves in the coupling. The outer surface of the cylindrical connecting seal comprises annular grooves 46 for metallic seal rings. The cylindrical connecting seal is able to provide a fluid tight connection between the first connecting ends 5 of the two coupling halves 1,2 of the double poppet valve coupling, see also FIG. 4. The center element 25 is arranged within the cylindrical connecting seal, and comprises a connecting rod 26 which is centered in the cylindrical connecting seal by four plate elements 27. The connecting rod 26 operationally connects the actuator rods 21 of the two coupling halves when the coupling is made up. The center element 25 allows the actuator rods of the coupling halves to be shorter than what would have been required for direct interaction. Due to the center element the actuator rods do not have to extend beyond the respective first connecting ends 5 and are thus protected from accidental damage during installation. The plate elements 27 of the center element 25 comprise knobs 28, each knob arranged on an elastic arm 41, for interaction with cooperating annular recesses 29 at the inner surface of the cylindrical connecting seal. The knobs are elastically displaceable for allowing insertion of the center element into the connecting seal and provide a locking effect when the knobs 28 are arranged in a cooperating annular recess 29. The purpose/effect of the knobs/recesses is disclosed in more detail by reference to FIGS. 6 and 7.

Figure 4:
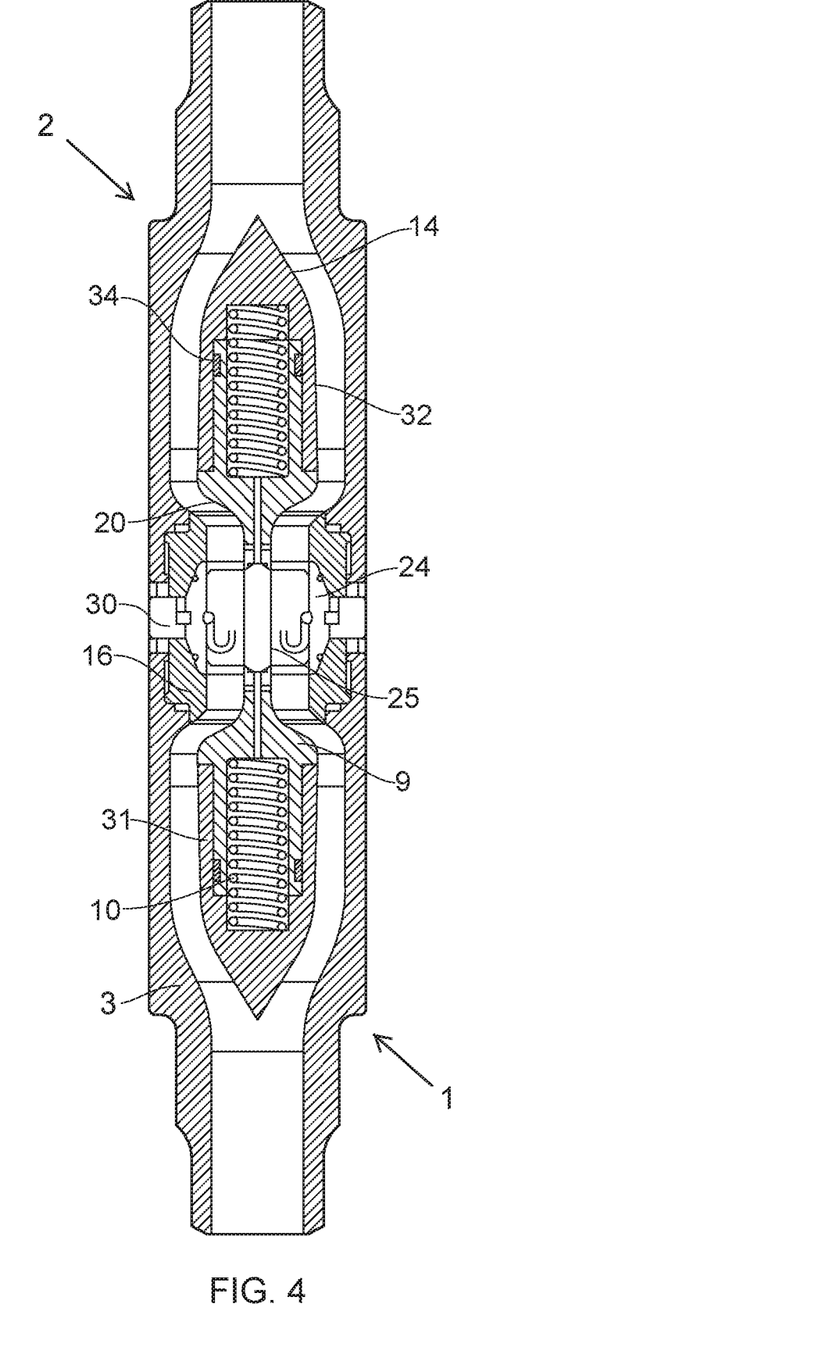
FIG. 4 is a cross-sectional view of a double poppet valve coupling made up of two coupling halves as shown in FIG. 1.

A complete double poppet valve coupling, comprising a first coupling half 1 and a second coupling half 2, is shown in FIG. 4. The first connecting ends 5 are connected via the cylindrical connecting seal 24 and the center element 25. The cylindrical connecting seal is held in place by the seal support ring 30. When connected, both poppet elements 9 are pushed into their second position, i.e. the through-going bores of both coupling halves, and thus the coupling, are open. In the second position the anchoring element 8 and the poppet element 9 form a unitary outer surface with a cylindrical middle section 32, a first end section comprising the conical valve seal surface 20, facing the poppet seat 11, and a second end section 14 having an outer circumferential surface tapering off towards the second connecting end. The unitary outer surface provides an optimized annular flow path having a minimal amount of directional changes and turbulence. The pressure drop over the poppet valve assembly is thus minimized.

To obtain the unitary outer surface, the anchoring element 8 and the poppet element 9 are adjacently joined at an outer circumferential surface of the anchoring element 8 and an outer circumferential surface of the poppet element 9 having the same diameter, such that an even or plane transitional surface is formed.

Figure 5:
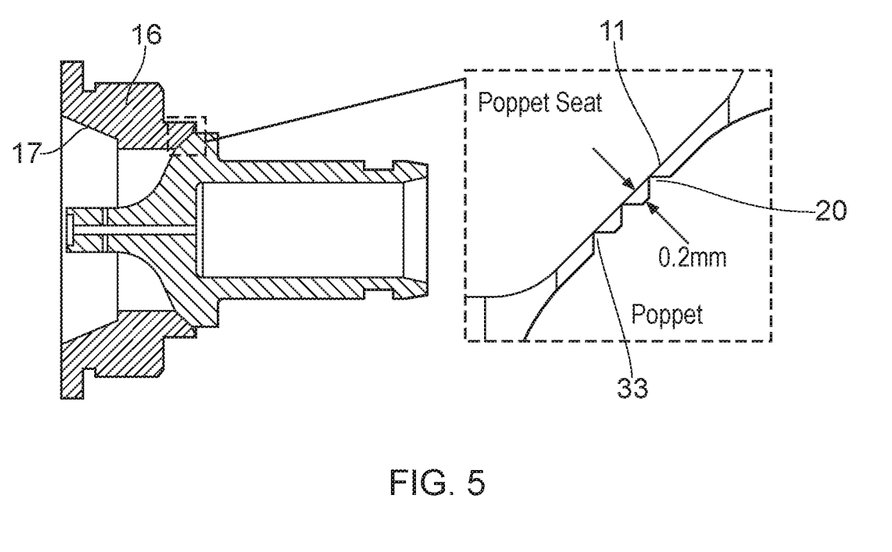
FIG. 5 is a detail of the seal surface of the poppet element.

An advantageous feature of the conical seal surface of the poppet element is shown in FIG. 5. The present poppet valve coupling is designed for fluid pressures of up to 1035 bar (15000 psi), and to obtain a tight sealing between the conical seal surface 20 and the poppet seat 11, it was discovered that a set of annular ribs 33 arranged on the conical seal surface provided an improved sealing. Optionally, the annular ribs may be arranged on the poppet seat.

Figure 6:
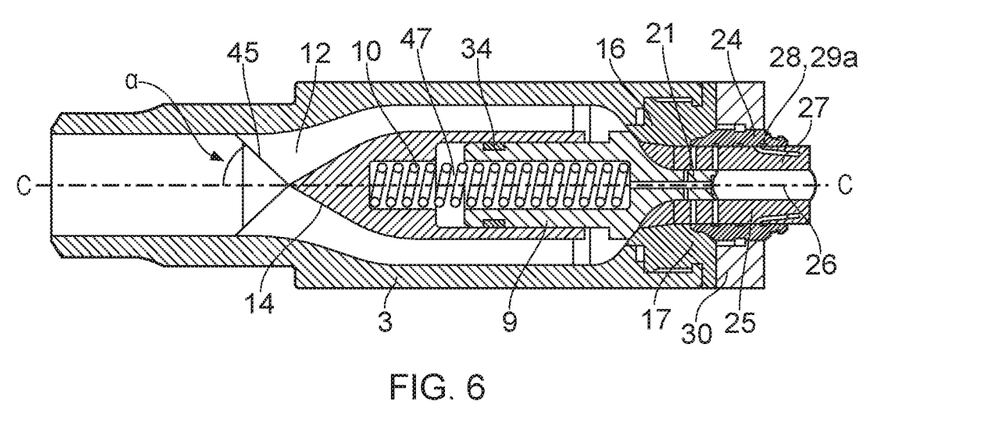
FIG. 6 is a cross-sectional view of a second embodiment of a coupling half according to the invention, featuring a cylindrical connecting seal and a center element.
Figure 7:
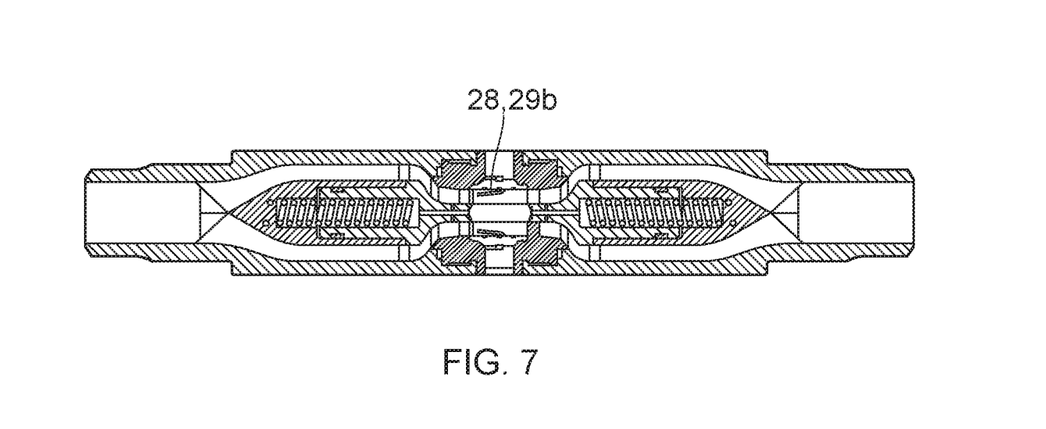
FIG. 7 is a cross-sectional view of a double poppet valve coupling made up of two coupling halves as shown in FIG. 6.

A slightly different embodiment of a first coupling half is illustrated in FIG. 6. The main difference between the coupling half of FIG. 6 and the coupling half disclosed in FIG. 1 is the design of the plate elements 12 connecting the anchoring element 8 to the inner surface of the through-going bore. To allow for additive manufacture of a section of the housing and the anchoring element as a single unit, the edges 45 of the plate elements facing the second connecting end 6 are inclined from the inner surface towards the point of the second end 14 of the anchoring element 8. The edges have an inclination or angle α of about 45° with respect to the centerline C of the coupling half. The inclination or angle is such that the edges are closer to the second connecting end 6 at the inner surface of the through-going bore than at the point of the second end 14. If the edges 45 have a larger inclination, i.e. more than about 50°, the additive manufacturing is much more difficult or impossible when using a metal powder. Thus, the inclination should be less than about 50°. In FIG. 6, the first coupling half is shown prior to coupling with a second coupling half. A cylindrical connecting seal 24 is connected to the first connecting end 5 and held in place by a seal support ring 30. A center element 25 is arranged within the connecting seal 24. The knobs 28 on the plate elements 27 keep the center element in a pre-connecting position by being arranged in the outer annular recess 29a and prevent the center element from falling out of the connecting seal during an initial phase of the coupling. When arranged in the pre-connecting position the connecting rod 26 is in contact with the actuating end of the actuator rod 21 while keeping the through-going bore closed, i.e. the poppet element 9 is in the first position. During coupling of the first coupling half with a second coupling half, the actuator rod of the second coupling half interacts with the connecting rod 26 of the center element 25. The actuator rods 21 of the first coupling half and of the second coupling half are operationally connected via the connecting rod 26, and the poppet elements 9 are pushed into their second position during coupling. When fully connected, see. FIG. 7, the knobs 28 of the plate elements 27 of the center element 25 are arranged in the annular recess 29b at the middle of the connecting seal 24. The center element 25 is able to accept an inclination of up to 3 degrees between the first and the second coupling halves, and provides guidance for the actuator rod 21 of the second coupling half, i.e. the coupling half not featuring the connecting seal before coupling.

To provide an improved interaction, the ends of the connecting rod and the actuating ends of the actuator rods are cooperatively designed, i.e. the ends of the connecting rod are concave, while the actuating ends of the actuator rods comprise a conical recess.

Figure 8:
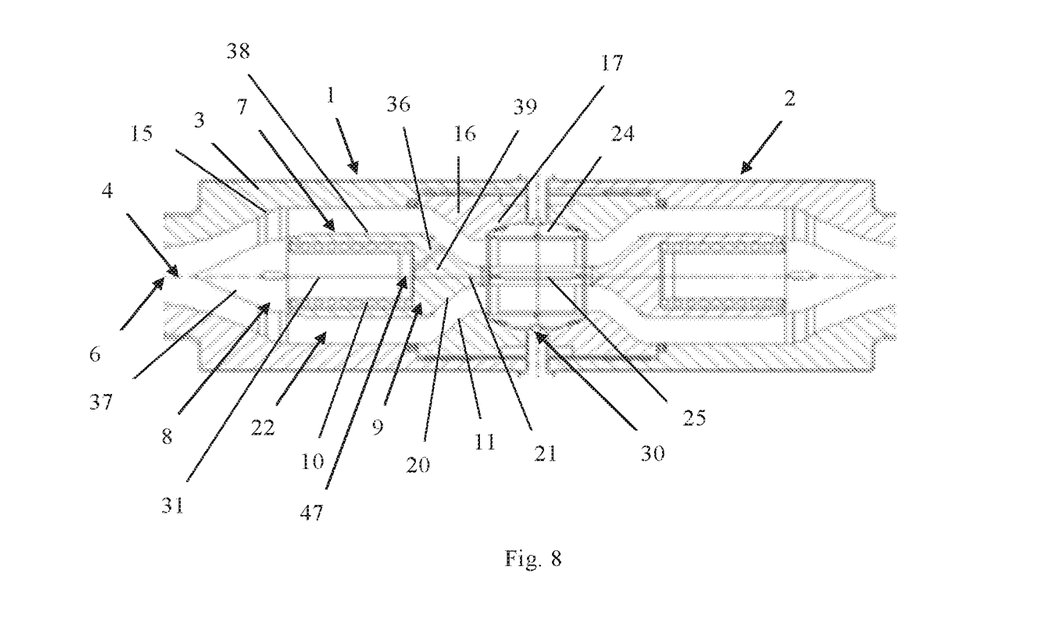
FIG. 8 is a cross-sectional view of a third embodiment of a coupling half according to the invention.
Figure 9:
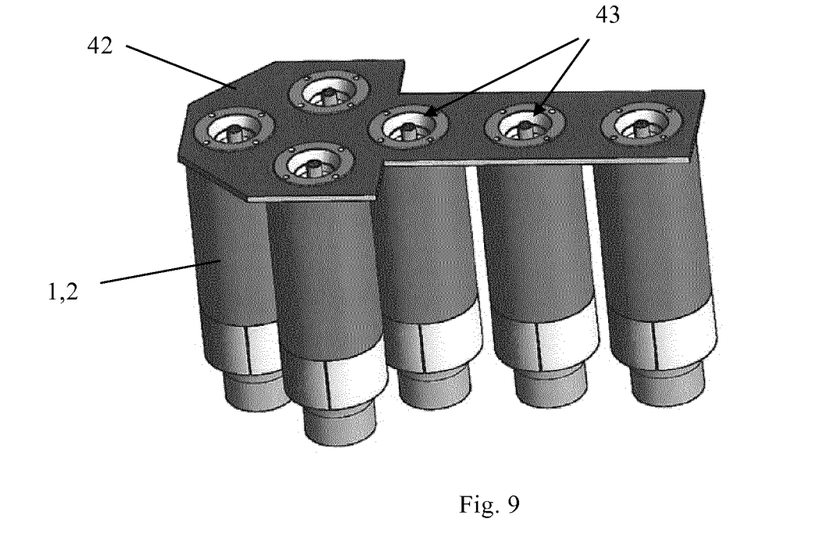
FIG. 9 is a perspective view of a retaining plate comprising multiple coupling halves according to the invention.
Figure 10:
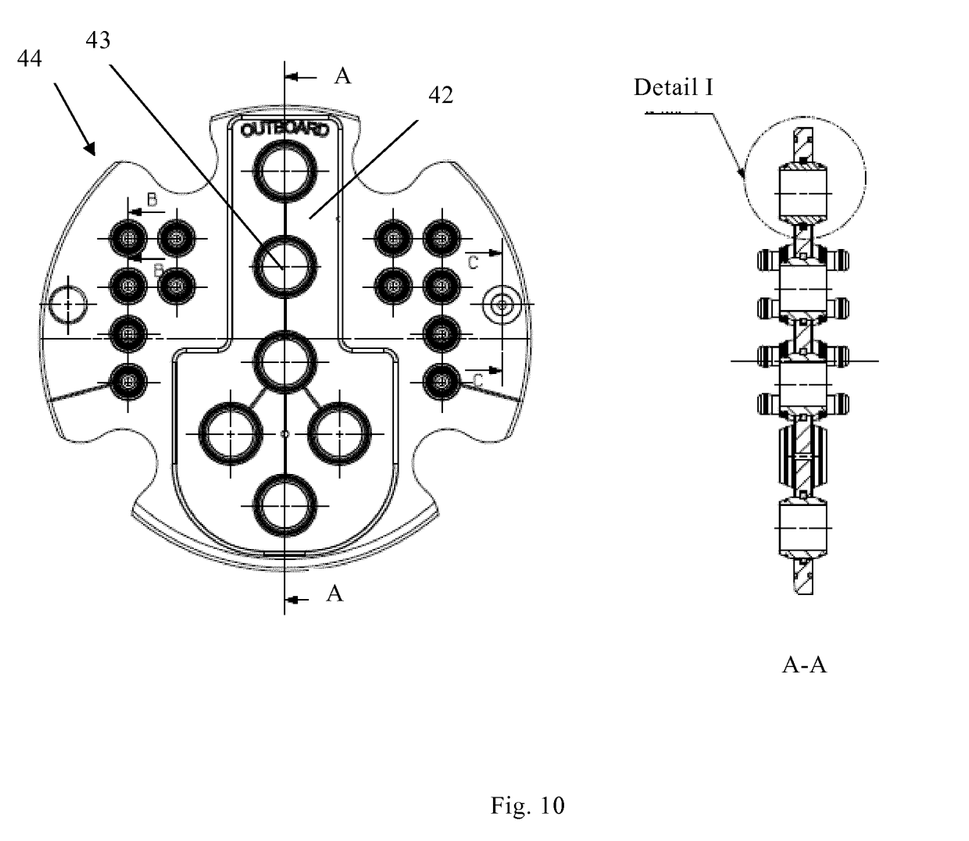
FIG. 10 is a front view of a front part of a multi-bore hub comprising the retaining plate in FIG. 9, and a cross-sectional view of same.
Figure 11:
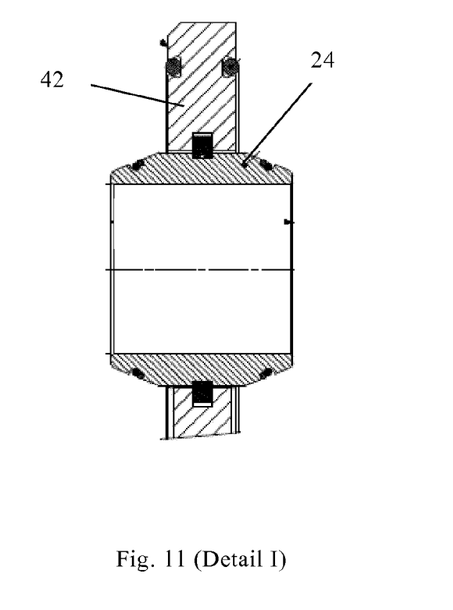
FIG. 11 is a detail from the cross-sectional view in FIG. 10.

A further embodiment of a double poppet valve coupling is shown in FIG. 8. The main difference between the double poppet valve coupling of FIG. 8 and the embodiments shown in FIGS. 1 and 4, is the design of the poppet valve assembly. In FIG. 8, the cylindrical section 31 of the anchoring element 8 is not required to be hollow, since the spring 10 is arranged around the circumference of the cylindrical section, and not within as is the case for the embodiments described above. Multiple coupling halves may be arranged in a multi-bore hub 44, see FIGS. 9-11. In that case, multiple through bores 43 in the retaining plate 42 will function as multiple seal support rings 30. Each of the through bores accommodates a cylindrical connecting seal 24.

Figure 12A:
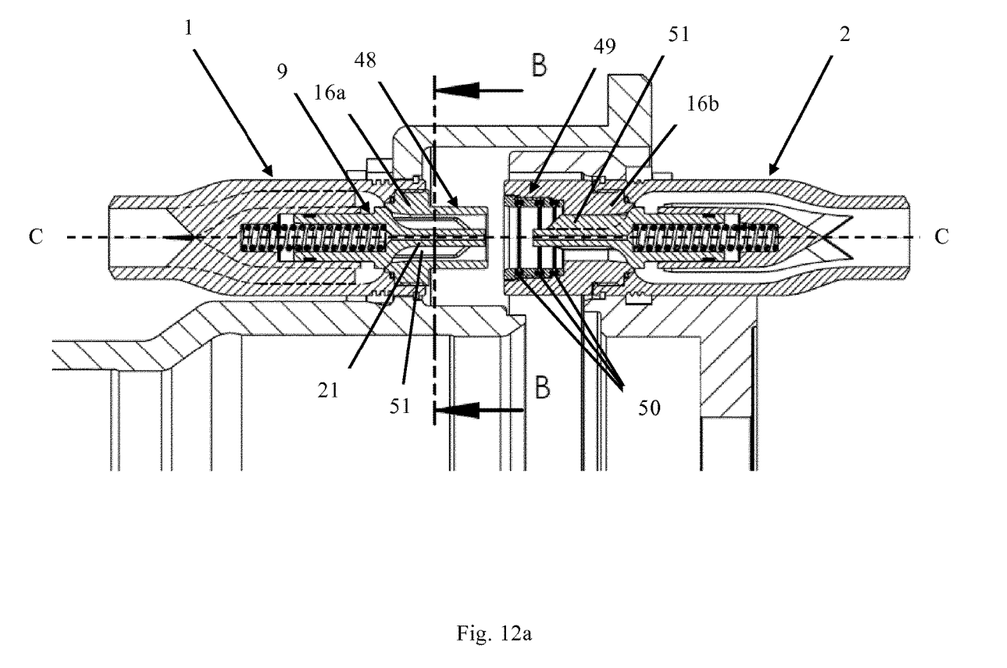
FIGS. 12a and 12b are cross-sectional views of a fourth embodiment of a double poppet valve coupling according to the invention, shown before connection is initiated.
Figure 12B:
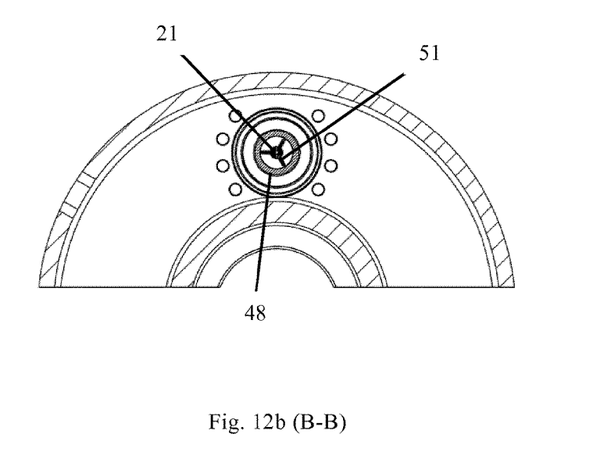
Figure 13A:
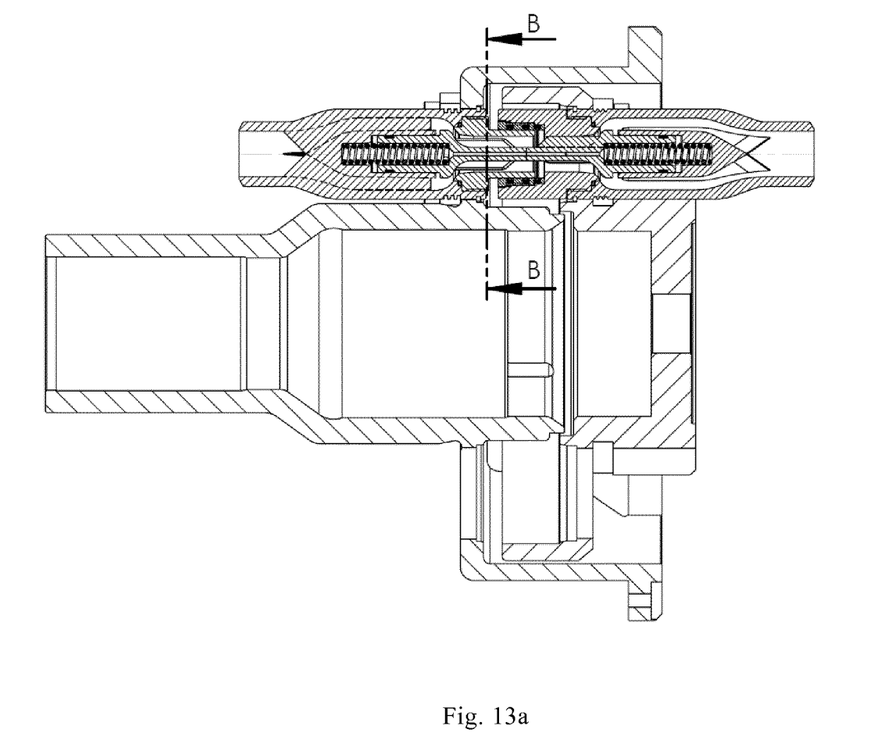
FIGS. 13a and 13b show the double poppet valve coupling in FIGS. 12a and 12b during connection.
Figure 13B:
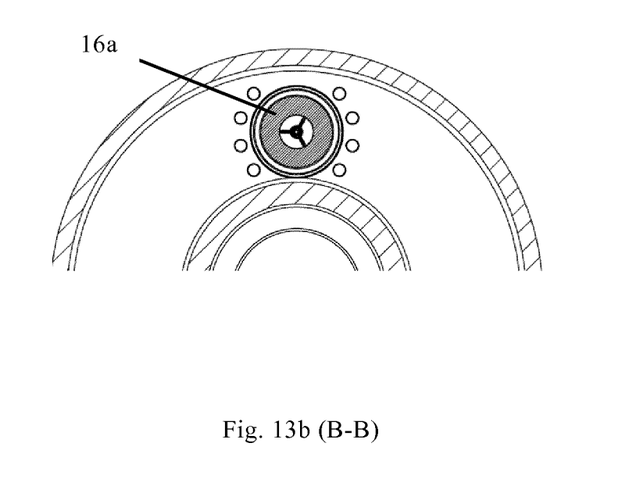
Figure 14A:
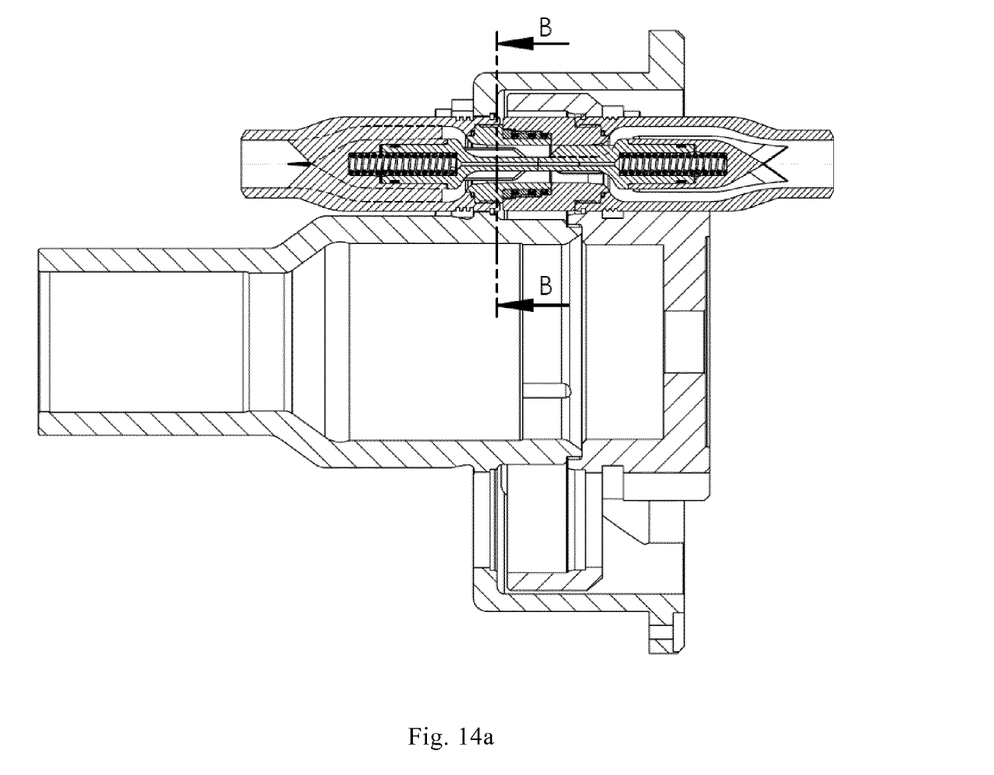
FIGS. 14a and 14b show the double poppet valve coupling in FIGS. 12a and 12b after connection.
Figure 14B:
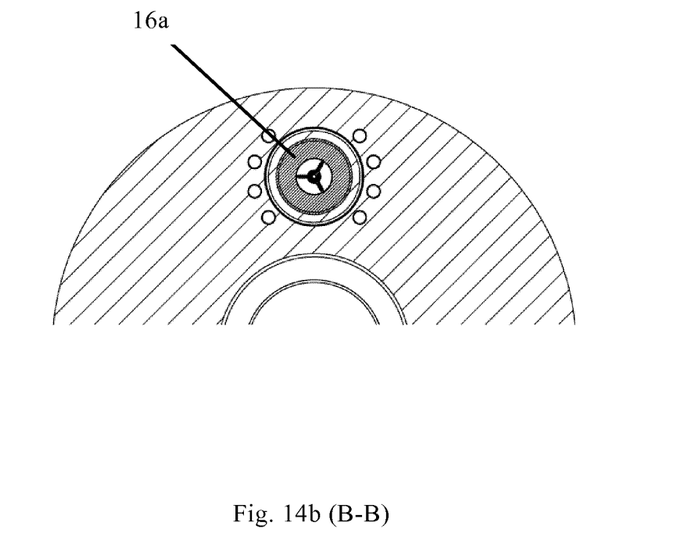

Yet a further embodiment of a double poppet valve coupling is shown in FIGS. 12-14 depicting three various stages of connection. In FIGS. 12-14, the double poppet valve coupling is shown as part of a multiple quick connect (MQC) assembly and is hereinafter termed a MQC poppet coupling for simplicity. In addition to the MQC poppet coupling, the MQC assembly may comprise two coupling halves of an additional coupling (not shown). The additional coupling is not further described, but various types of suitable couplings are obvious to the skilled person. In the MQC poppet coupling, the two coupling halves 1,2 are not connected via a cylindrical connecting seal 24 as shown in the preceding embodiments (see for instance FIGS. 3 and 4). Instead, the valve seat ring 16a,16b of the first coupling half 1 and of the second coupling half 2 comprises a male/stab 48 and a female/receptacle 49 connecting interface, respectively.

During connection, the stab connecting interface 48 is inserted into the receptacle connecting interface 49 to provide a fluid tight coupling between the two coupling halves. To obtain a tight seal between the connecting interfaces, i.e. to provide room for the three O-ring seals 50 within the receptacle interface, the connecting interfaces must have a certain length. As opposed to the embodiments disclosed above, the design of the connecting interfaces of the MQC coupling requires the actuator rods 21 of the poppet elements to be longer. Long actuator rods increase the chance of misalignment of the actuator rods and potential damage to the poppet valve during connection. To alleviate and/or prevent the chance of, or the magnitude of, misalignment and/or damage, the actuator rods of the first and second coupling halves have plate-shaped centering elements 51. The centering elements are arranged to restrict movement of the actuator rods in a direction perpendicular to the centerline C of the coupling. The plane of each centering element is aligned with the centerline of the coupling. The centering element extend from the actuator rod towards an inner surface of the valve seat ring, the inner surface being part of the flow path of the coupling. In the illustrated embodiment, each of the actuator rods features three evenly spaced centering elements, i.e. the planes of the centering elements are staggered by 120° around the centerline of the coupling (or the rod element of the actuator rod).

The centering elements ensures a robust and reliable coupling even when the connecting interfaces have a length being adequate to provide the coupling with a tight fluid sealing featuring three O-rings. Further, the feature of having centering elements on the actuator rods also allows for coupling interfaces of an extended length. The latter may for instance be required when the length of the MQC coupling must be adapted for use in a stab plate featuring different types of couplings, as in a MQC assembly.

Figure 15A:
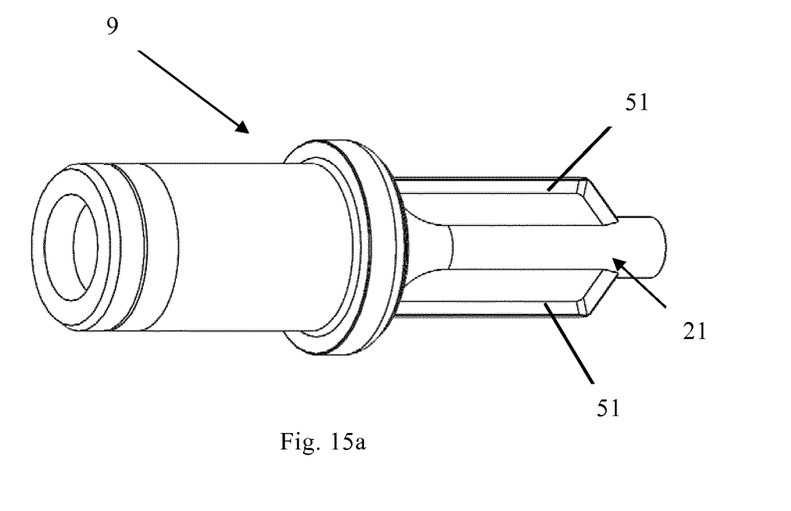
FIGS. 15a-15c show different views of a poppet element for use in the fourth embodiment of a double poppet valve coupling.
Figure 15B:
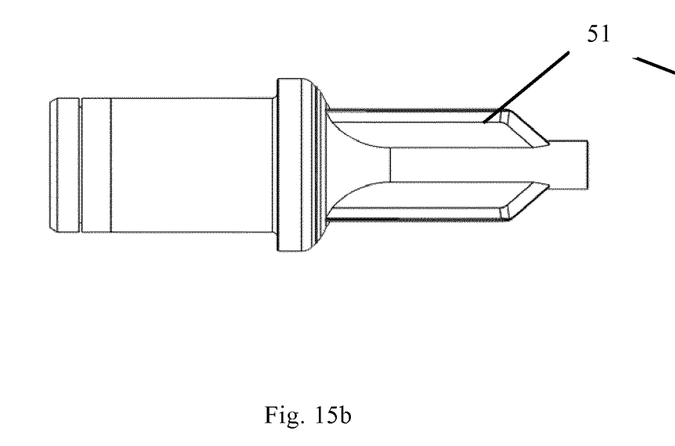
Figure 15C:
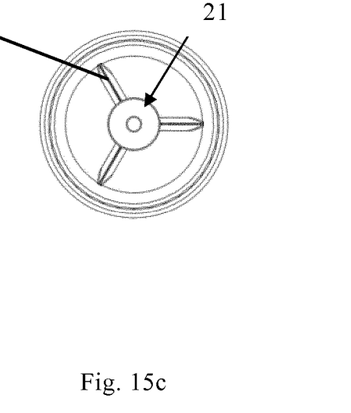

Various views of the poppet element 9 used in the double poppet valve coupling in FIGS. 12-14 are shown in FIGS. 15*a-c*.

The invention claimed is:

1. A double poppet valve coupling comprising:
a first coupling half and a second coupling half, each of which comprises a housing and a poppet valve assembly, the housing comprising a through-going bore, a first connecting end, a second connecting end and a poppet seat, the first and second coupling halves being coupleable together via their respective first connecting ends such that the respective poppet valve assemblies are opened to thereby provide a continuous flow path through the coupling;
wherein the poppet valve assembly is centrally arranged in the through-going bore and comprises an anchoring element, a poppet element and a spring;
the anchoring element being connected to an inner surface of the through-going bore and comprising a cylindrical section and an end section, the end section having an outer circumference tapering off towards the second connecting end;
the poppet element being slidably connected to the anchoring element and comprising a cylindrical section and an end section, the end section comprising a poppet seal surface for interaction with the poppet seat and an actuator rod extending in the direction of the first connecting end; and
the spring being arranged between the poppet element and the anchoring element and preloading the poppet element to abut against the poppet seat, thereby closing the through-going bore in a first position, and being enclosed within an enclosure defined by a hollow cylindrical section of at least one of the poppet element and the anchoring element, thereby opening the through-going bore when the poppet element is in a second position;
wherein the anchoring element and the poppet element are arranged to provide an annular flow path between the outer surface of the poppet valve assembly and the inner surface of the through-going bore;
wherein the end section of the poppet element comprises a pressure equalizing fluid channel providing fluid contact between the enclosure formed by the hollow cylindrical section of said at least one of the poppet element and the anchoring element and the annular flow path when the poppet element is in the second position, and between the enclosure and the surroundings of the coupling when the poppet element is in the first position;
wherein the first connecting end comprises a valve seat ring on which the poppet seat is formed, the valve seat ring being releasably connected to the coupling half, and the housing and the poppet element being configured such that the poppet element can be removed and replaced through the first connecting end; and
wherein the valve seat rings of the first and second coupling halves are configured to seal against each other or against an intermediate connecting element which is disposed between the first and second coupling halves.

2. The coupling according to claim 1, wherein the first and second coupling halves are coupled together by the intermediate connecting element to thereby form a seal between the first connecting ends of the coupling halves.

3. The coupling according to claim 2, wherein the intermediate connecting element comprises a cylindrical connecting seal and the valve seat ring comprises a connecting seal seat for the cylindrical connecting seal, and wherein the cylindrical connecting seal is arranged to seal against both the connecting seal seat of the first coupling half and the connecting seal seat of the second coupling half when the coupling halves are connected.

4. The coupling according to claim 3, wherein a center element is arranged within the cylindrical connecting seal and is configured to operationally connect the actuator rods of the first and second coupling halves such that the poppet elements are moved to the second position when the coupling halves are connected.

5. The coupling according to claim 4, wherein the center element comprises a first actuator end and a second actuator end for interaction with the actuator rods of the first and second coupling halves, respectively.

6. The coupling according to claim 1, wherein the anchoring element is integrally connected to the inner surface of the through-going bore by at least two plate elements, the plane of each plate element being arranged in parallel to the centerline (C) of the coupling, and wherein the anchoring element, the plate elements and at least a section of the housing to which the plate elements are connected are made as a single unit by use of additive manufacturing.

7. The coupling according to claim 6, wherein each of the plate elements comprises an inclined edge having an angle α of less than 55° with respect to the centerline (C) of the coupling.

8. The coupling according to claim 1, wherein at least one of the actuator rods comprises at least three centering elements which are arranged to restrict movement of the actuator rod in a direction perpendicular to the centerline of the coupling.

9. The coupling according to claim 8, wherein the centering elements are plate-shaped and the plane of each plate-shaped centering element is aligned with the centerline of the coupling.

10. The coupling according to claim 7, wherein the inclined edge faces the second connecting end and is inclined from the inner surface towards the end section of the anchoring element.

11. A hub for connecting multiple valve couplings according to any of claims 3-9 and 10, the hub comprising a retaining plate having multiple through bores, wherein each through bore accommodates a cylindrical connecting seal.

* * * * *